United States Patent Office 2,847,345
Patented Aug. 12, 1958

2,847,345

ANTI-SUCKING COMPOSITION FOR CALVES

Florian J. Zajackowski, Norrie, Wis.

No Drawing. Application April 20, 1955
Serial No. 502,744

4 Claims. (Cl. 167—53.2)

The present invention relates to a composition which may be sprayed on livestock young to prevent them from sucking one another.

In the raising of cattle a problem is encountered in preventing young calves from sucking one another. Basically, my invention resides in the discovery of a composition which may be sprayed upon the calves in a simple and efficacious manner which will effectively prevent valves from attempting to nurse from one another for long periods of time.

Essentially, the composition comprises a mixture of pine tar, peppermint and camphor. The ingredients are blended with one another through the medium of proper solvents, alcohol. Preferably, the alcohol utilized is one of the lower aliphatic alcohols, such as methyl or ethyl because of their availability.

The pine tar of the composition is by nature a viscous liquid and serves as an excellent base for the composition in causing the composition to adhere to the portion of the surface of the calf on which it is sprayed. Additionally, the pine tar possesses a characteristic sharp taste and empyreumatic odor. Further, the pine tar is not harmful to the skin of the calf, being utilized in many instances in fact as a treatment for eczema, mange and the like.

The peppermint is utilized in the composition for its characteristic taste and sharp pungent odor.

The camphor utilized in the composition possesses a penetrating odor which combines with the tar and peppermint odors giving a net resulting thoroughly disagreeable odor to calves which effectively inhibits any tendency of the calves to attempt to nurse from one another.

Although the camphor is rubefacient, this property is more than offset by analgesic property thereof and the soothing effect of the pine tar.

The composition is generally sprayed on the ears or stomach of each calf, these areas the most susceptible to sucking from other calves. The composition may be applied with a common hand sprayer or pressurized containers, if desired.

In the formation of the composition, the following procedure is utilized.

First, the pine tar is heated to approximately 180° F.

Next, a quantity of essence of peppermint, U. S. P. and alcohol consisting of approximately 20% peppermint and 80% alcohol by volume is mixed with the heated pine tar.

Then, a quantity of blended pure spirits of camphor and alcohol consisting approximately of 15% camphor and 85% alcohol by volume is mixed in with the other ingredients and all of the ingredients blended together over heat while the temperature is maintained at approximately 180° until a homogeneous liquid solution results.

A particularly successful composition has been made utilizing the following proportions:

| | Parts |
|---|---|
| Pine tar | 1 |
| Peppermint-alcohol (20% peppermint and 80% alcohol) | 2 |
| Camphorated alcohol (camphor 15%, alcohol 85%) | 2 |

It is to be understood that the above noted formula is exemplary and not limitive.

The composition is extremely long lasting having an extremely tenacious, very slowly liberated odor, and one application of the composition to each calf will prevent attempted nursing by sucking among themselves of the calves for a long period of time without difficulty.

From the foregoing description the composition comprising the invention will be readily understood by those skilled in the art.

What is claimed as new is as follows:

1. A composition for a spray preventing very young calves from sucking one another, said spray consisting of a mixture of pine tar, peppermint and camphor in alcohol.

2. The combination of claim 1 wherein said pine tar is approximately 20% by volume of said mixture, said peppermint and camphor and alcohol constituting approximately 80% of the mixture and wherein said peppermint and alcohol are blended with one another in the volume ratio of approximately 1 to 4, and the camphor and alcohol are combined with one another in the volume ratio of approximately 1 to 5.

3. An anti-sucking composition for livestock calves consisting of a mixture by volume of approximately 1 part pine tar, 1 part of a blend of 20% peppermint and 80% alcohol by volume, and one part of a blend of 15% camphor and 85% alcohol by volume.

4. A process for preventing calves from sucking one another comprising the application by spraying of a mixture of an alcoholic solution of camphor and peppermint with pine tar.

References Cited in the file of this patent

UNITED STATES PATENTS

| 282,769 | Quinlan | Aug. 7, 1883 |
| 403,121 | Martin | May 14, 1889 |
| 1,877,676 | Lockwood | Sept. 13, 1932 |
| 2,667,438 | Gardner | Jan. 26, 1954 |

OTHER REFERENCES

Hutyra et al.: Special Pathology and Therapeutics, vol. III, 1938. Alexander Eger, Chicago, Ill., pp. 235–242.

U. S. Dispensatory, 24th ed., 1947, Lippincott Co., Philadelphia, Pa., pp. 206, 851 and 1187.